US011943153B2

(12) United States Patent
Yao et al.

(10) Patent No.: US 11,943,153 B2
(45) Date of Patent: Mar. 26, 2024

(54) USING BUFFERED AUDIO TO OVERCOME LAPSES IN TELEPHONY SIGNAL

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 381 days.

(21) Appl. No.: 17/360,372

(22) Filed: Jun. 28, 2021

(65) Prior Publication Data
US 2022/0417183 A1    Dec. 29, 2022

(51) Int. Cl.
*H04W 88/02*    (2009.01)
*G10L 15/26*    (2006.01)
*H04L 49/90*    (2022.01)

(52) U.S. Cl.
CPC ............. *H04L 49/90* (2013.01); *G10L 15/26* (2013.01); *H04W 88/02* (2013.01)

(58) Field of Classification Search
CPC ......... H04L 49/90; G10L 15/26; H04W 88/02
See application file for complete search history.

(56) References Cited

U.S. PATENT DOCUMENTS

| 9,306,708 | B2* | 4/2016 | Lu ......................... H04L 1/1671 |
| 10,986,555 | B1* | 4/2021 | Moshayedi ......... H04L 12/2889 |
| 2003/0055647 | A1* | 3/2003 | Yoshioka ................ G10L 25/93 |
| | | | 704/258 |
| 2005/0052285 | A1* | 3/2005 | Iriyama ................ H04R 29/007 |
| | | | 379/106.01 |
| 2012/0089390 | A1* | 4/2012 | Yang ....................... G10L 21/04 |
| | | | 704/207 |
| 2012/0128146 | A1* | 5/2012 | Boss ..................... H04M 3/564 |
| | | | 379/202.01 |
| 2013/0003579 | A1* | 1/2013 | Lu ......................... H04N 21/631 |
| | | | 370/252 |
| 2019/0342653 | A1* | 11/2019 | Zhou .................. H04M 1/6066 |
| 2020/0265854 | A1* | 8/2020 | Moon ...................... H04R 3/00 |
| 2021/0129019 | A1* | 5/2021 | Colenbrander ....... A63F 13/355 |

FOREIGN PATENT DOCUMENTS

| CA | 2922710 | A1 * | 4/2009 | ......... H04L 12/5835 |
| CN | 101873219 | A | * | 10/2010 | |

* cited by examiner

*Primary Examiner* — Jay P Patel
*Assistant Examiner* — Shehab A Alawdi
(74) *Attorney, Agent, or Firm* — Kipman Tyler Werking; VLP Law Group LLP

(57) ABSTRACT

A facility for conveying first side of a voice call from a first participant to a second participant is described. Over the duration of the voice call, the facility receives the first side of the call. The facility seeks to forward the received first side of the voice call to a downstream node on a path to the second participant. The facility records the received first side of the call for at least part of the call. The facility identifies a just-ended portion of the voice call for which forwarding of the received first side of the voice call was unsuccessful. In response, the facility transmits to the downstream node the recorded first side of the voice call that coincides with the identified portion of the voice call.

20 Claims, 9 Drawing Sheets ered by the facility with buffering, the facility operates a buffer at the upstream end of the link. Audio received at this buffer during a lapse of the downstream link is recorded by the buffer, and played from the buffer through the link when the lapse ends.
USING BUFFERED AUDIO TO OVERCOME LAPSES IN TELEPHONY SIGNAL

BACKGROUND

In a telephone call, two people in different locations share a bidirectional real-time audio link: call participant A's speech is conveyed to call participant B for participant B to hear, and participant B's speech is conveyed to participant A for participant A to hear. A telephone call between these participants enables them to engage in a conversation similar to one they might have if they were in the same location, despite not being in the same location.

Various technologies support telephone calls, including Public Switched Telephone Networks, Primary Rate Interface, Voice Over IP, Session Initiating Protocol, H.323, Media Gateway Control Protocol, and wireless networks.

DETAILED DESCRIPTION

Figure 1:
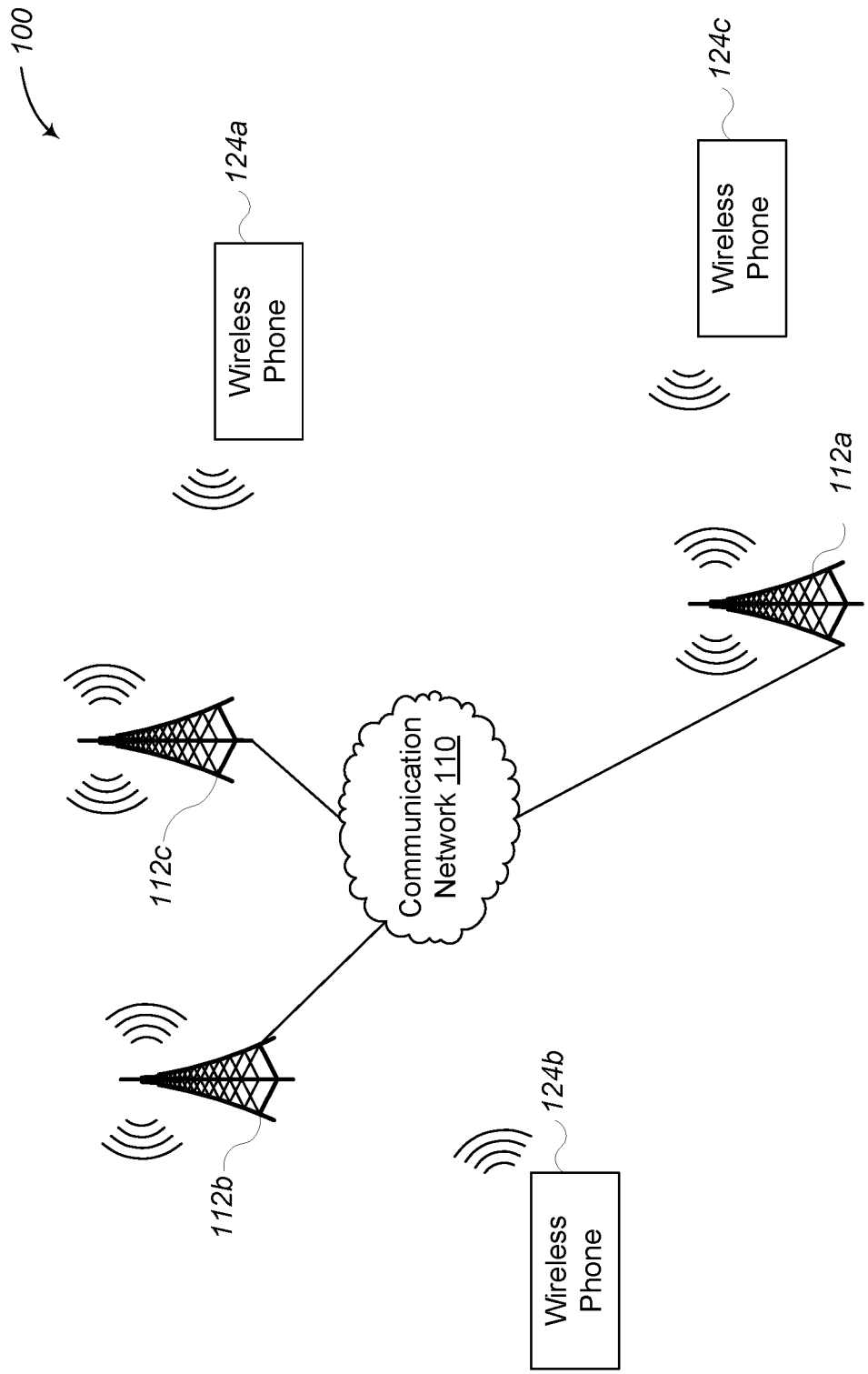
FIG. 1 is a context diagram of an environment in which the facility operates in some embodiments.

The inventors have recognized significant disadvantages of conventional approaches to supporting telephone calls. Each telephony technology has the potential of introducing brief interruptions in a call. For example, a call supported by a wireless network may be briefly interrupted in both directions when a wireless phone moves to a location where it no longer has a line-of-sight to the wireless network tower to which it has been connected, requiring the phone to negotiate a connection to a tower to which it does now have a line-of-sight, or when the wireless phone moves from one cell of the wireless network to another. Voice Over IP connections may face IP network congestion, and SIP, Public Switched Telephone Networks, Session Initiating Protocol, H.323, and Media Gateway Control Protocol can encounter electromagnetic interference.

The inventors have observed that these interruptions—which typically substitute silence or loud, discordant noise for their calling partner's voice—often throw conversations off course, forcing one or more participants to try to understand their partner's later speech after the interruption ends without the benefit of hearing their earlier speech during the interruption.

To overcome these disadvantages, the inventors have conceived and reduced to practice a software and/or hardware facility for using buffered audio to overcome lapses in telephony signal ("the facility").

In a telephone call, each "side" of the call has a directional path conveying an audio signal from a microphone near one of the participants to a speaker near the other participant. For example, for a call in which each of the participants is using a mobile phone, each side of the call might have a path that begins in a speaking participant's mobile phone; traverses a radio link from the speaking participant's mobile phone to a wireless tower; the tower will transmit the data to a local data center where core and IMS resides, the data will be then processed and traverses wired links to a switch; traverses wired links to a wireless tower near the listening participant's phone; and traverses a radio link from that wireless tower to the listening participant's phone.

In some embodiments, the facility selects one or more of a call's links to protect with buffering. In the above example, the four wireless links may be regarded as particularly vulnerable to lapses, and are therefore each protected by the facility. For each link protected by the facility with buffering, the facility operates a buffer at the upstream end of the link. Audio received at this buffer during a lapse of the downstream link is recorded by the buffer, and played from the buffer through the link when the lapse ends.

In some embodiments, the facility continues recording audio newly-received at the buffer while earlier-received audio is being played from the buffer, so that none of this side of the conversation is lost. In some embodiments, the facility plays buffer contents at a faster rate than they were recorded, such as twice as fast, in order to "catch up to live" more quickly. In some embodiments, the facility plays a tone or other brief sound immediately before playing buffer contents, in order to alert the listening participant that cached audio for this side is about to be played.

In some embodiments, some or all of the buffers operated by the facility are continuous buffers that are always recording the audio received at the buffer, and are indexed by time of day. At the downstream end of the protected link, a lapse detector and notifier monitors for lapses, and stores their starting time. The lapse detector and notifier is connected to a lapse remediator at the upstream end of the protected link. As soon after the lapse starting time as the lapse detector and notifier monitors can communicate with the lapse remediator (The lapse may interrupt the ability of the lapse detector and notifier monitors to communicate with the lapse remediator.), the lapse detector and notifier sends a lapse message to the lapse remediator containing the lapse starting time. In response to receiving the lapse message, the lapse remediator controls the buffer to begin playback from the starting time index, and the buffer continues to play these buffer contents until it catches up to live. In some embodiments, the facility uses a circular buffer as this continuous buffer.

In some embodiments, some or all of the buffers operated by the facility are selective buffers that are controlled to record only during lapses. At the upstream end of the protected link, a lapse detector and remediator monitors for lapses of the link. When the lapse detector and remediator detects the beginning of a lapse, it controls the buffer to begin recording the audio received at the buffer. When the lapse detector and remediator detects the end of a lapse, it controls the buffer to begin playing back the recorded audio, and the buffer continues to play these buffer contents until it catches up to live.

In some embodiments, the facility performs voice transcription on audio stored in some or all of its buffers, and transmits the resulting text for display to the listening participant, such as in an SMS message.

In some embodiments, the facility operates with respect to calls in which more than two people are simultaneously communicating. In a manner similar to that discussed elsewhere herein, the facility uses buffers to protect some or all of the links used to connect the participants in such larger calls.

By performing in some or all of the ways discussed above, the facility provides all of the audio spoken by each call partner to the other, even audio spoken during time periods when a link connecting the call lapsed. This measure of resiliency added by the facility makes calls more straightforward, useful, time-efficient, and comfortable for their participants.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, the facility can significantly reduce the duration of a call—by eliminating portions of the call during which the participants would discuss the interruption caused by the lapse, and those during which they would repeat the information each provided during the lapse that was not heard—and thus the length of time for which the call occupies hardware resources. This permits the same number of calls to be supported using lower levels of hardware resources, or a greater number of calls to be supported using the same hardware resources.

FIG. 1 is a context diagram of an environment in which the facility operates in some embodiments. Environment 100 includes a plurality of cells 112a-112c, a plurality of wireless phones or other user devices 124a-124b, and a communication network 110. Illustratively, the cells 112a-112c correspond to cell sites (e.g., cellular towers) that together implement a 5G cellular communications network, or a wireless communications network using another standard. The cells 112a-112c may include or be in communication with base stations, radio back haul equipment, antennas, or other devices, which are not illustrated for ease of discussion.

Each cell 112a-112c provides cellular communications over a coverage area. The coverage area of each cell 112a-112c may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication network 110. Communication network 110 includes one or more wired or wireless networks, which may include a series of smaller or private connected networks that carry information between the cells 112a-112c.

The user devices 124a-124c are computing devices that receive and transmit cellular communication messages with the cells 112a-112c, e.g., via antennas or other means. Examples of user devices 124a-124c may include, but are not limited to, mobile devices, smartphones, tablets, cellular-enabled laptop computers, or other UE or computing devices that can communicate with a cellular network.

Figure 2:
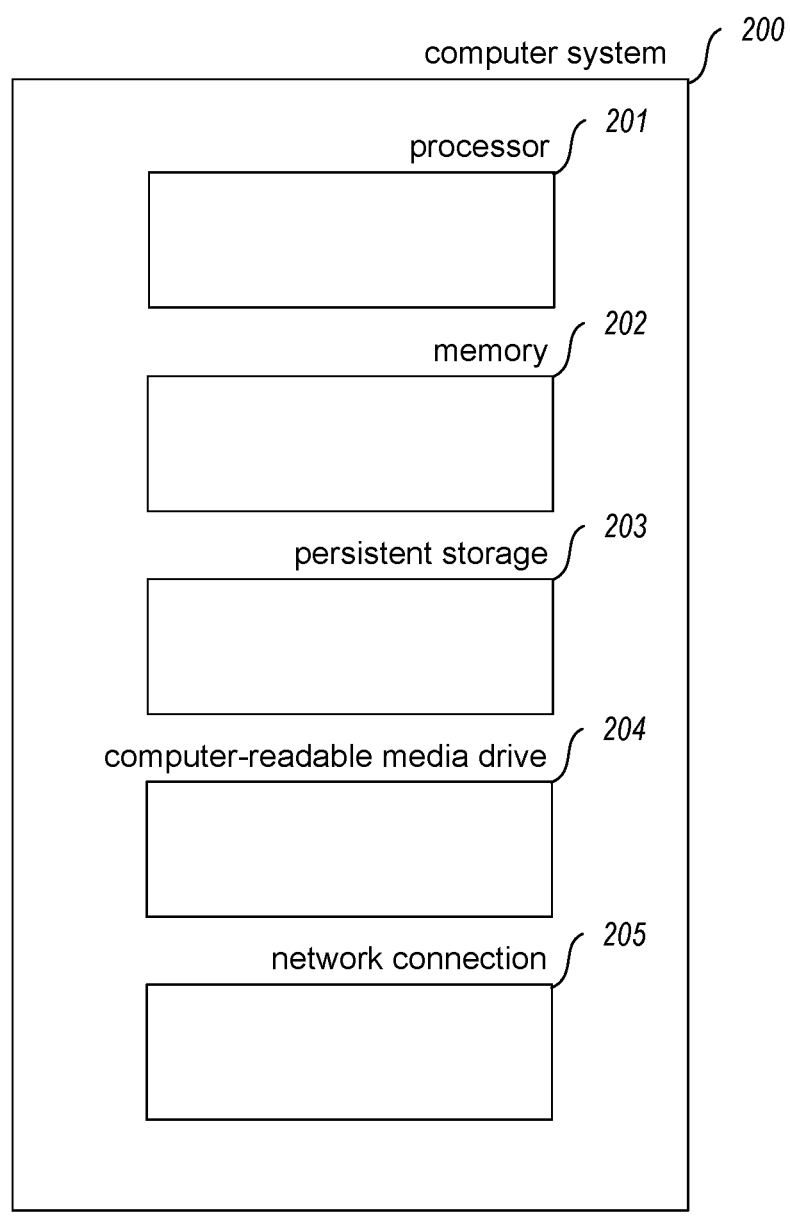
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. In some embodiments, devices that are wireless phones or other devices capable of placing and conducting audio calls include additional components, such as a microphone for capturing speech; a speaker for outputting speech; one or more radios and antennas for wireless communication; data encoding, compression, encryption, and routing mechanisms; etc. While computer systems configured as described above are typically used to support the operation of the facility, those skilled in the art will appreciate that the facility may be implemented using devices of various types and configurations, and having various components.

Figure 3:
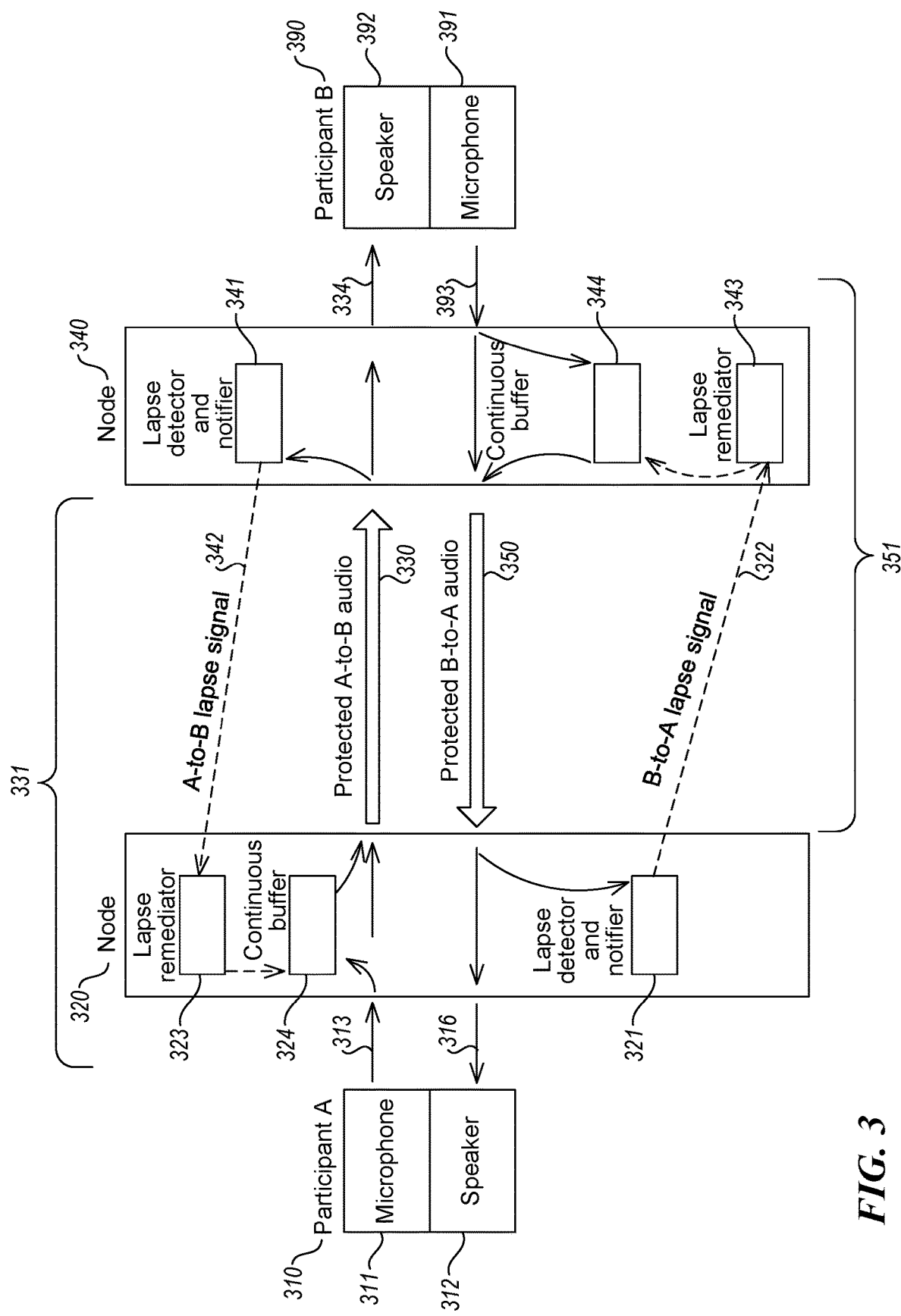
FIG. 3 is a data flow diagram showing operation of the facility in some embodiments in a generalized environment using a continuous buffer.

FIG. 3 is a data flow diagram showing operation of the facility in some embodiments in a generalized environment using a continuous buffer. The diagram shows a call between participant A 310 and participant B 390. The call is made up of two paths. The first is from participant A's microphone 311, through link 313 to node 320, through link 330 to node 340, and through link 334 to participant B's speaker 392. This path conveys a first "side" of the call, in which participant A's speech is conveyed to participant B. The second depicted path corresponds to a second side of the call, in which participant B's speech is conveyed to participant A. In this path, data travels from participant B's microphone 391 through link 393 to node 340, through link 350 to node 320, and through link 316 to participant A's speaker 312. As shown in this generalized environment, the intermediate nodes are nodes 320 and 340, and the links are links 313, 330, 334, 393, 350, and 316. The nodes may variously be mobile phones, landline phones, VOIP phones, phones of other types, or devices of other types capable of operating as a telephony terminal and making and/or receiving phone or other voice calls. The nodes may also be nodes that are intermediate to phones or other telephony devices, mobile base stations, routers, switches, servers, etc. Similarly, the links can be any of a wide variety of links capable of conveying telephony data, including wireless links, wired links, optical fiber links, unguided laser or light links, etc. The telephony data may be encoded in any of a wide variety of ways on these links, including any kind and/or number of layers for compression, encryption, routing, data integrity, billing, routing security, etc. The selection of nodes in which the facility implements lapse detector and notifiers and lapse remediators defines the logical links that are protected. In some embodiments, these logical links can be compound links made up of two or more physical links, which may be of the same or different types, and which may be joined by nodes in which the facility does not implement lapse detector and notifiers or lapse remediators.

The diagram shows the facility being used to protect two links with voice data buffering: protected link 330 from node 320 to node 340 in the first path, and protected link 350 from node 340 to node 320 in the second path. With respect to protected link 330, the facility causes a continuous buffer 324 outfitted in node 320 to continuously record the audio data from participant A's microphone 311 received by node 320 in link 313. In some embodiments, continuous buffer 324 and the other continuous buffers discussed herein are circular buffers. A circular buffer retains the last m minutes or s seconds of received audio, and discards audio that is older. In various embodiments, the facility selects this buffer residency time in a manner that balances the ability to fully store audio for the length of expected lapses against the amount of memory consumed by the buffer and the fidelity of the audio stored in the buffer. In various embodiments, the facility uses a continuous buffer length of five seconds, 10 seconds, 15 seconds, 20 seconds, 30 seconds, 45 seconds, 60 seconds, 90 seconds, two minutes, five minutes, etc.

As participant A's audio signal continues on through link 330 toward node 340, a lapse detector and notifier 341 of node 340 monitors receipt of audio data via link 330. If the lapse detector and notifier detects a lapse—such as the failure to receive any signal from node 320, receiving data from node 320 that contains no discernable audio, or audio determined by the detector to be of low quality—then the lapse detector and notifier stores the time at which the beginning of the lapse is detected. The lapse detector and notifier continues to monitor link 320, seeking to identify the time at which the lapse ends, such as when a signal via the link is restored, or when audio received via the link is determined to be of an adequate quality. At this time, the lapse detector and notifier stores the lapse ending time, and notifies node 320 of the just-ended lapse. It does this by sending an A-to-B lapse signal 342 from the lapse detector and notifier to a lapse remediator 323 of node 320. In various embodiments, the lapse signal is sent by the same or a different means than is link 330.

When the lapse remediator receives the A-to-B lapse signal, it controls buffer 324 in order to begin playing the buffer's contents starting at the lapsed beginning time contained by the lapse signal. In some embodiments, before beginning the playing of the buffer's contents, the facility plays a distinctive tone or other short sound, or a recorded or synthesized voice message, indicating that buffered call audio will follow. As the buffer plays this audio to replace the corresponding audio that was lost during the lapse, the buffer continues to record participant A's audio received via link 313, without immediately passing it through to link 330. In some embodiments, the buffer plays its contents at a higher rate than they were recorded, such as 1.25 times as fast, 1.5 times as fast, 1.75 times as fast, twice as fast, 2.5 times as fast, three times as fast, four times as fast, etc. This acceleration of the played-back audio permits the first side of the call to catch up with participant A's present speech. The facility chooses a playback rate that optimizes between catchup time and intelligibility. In order to boost intelligibility, in some embodiments the facility processes the played-back audio to reduce its frequency, via techniques such as frequency filtering, frequency reduction, pitch scaling, audio time stretching, etc. In various embodiments, the facility uses additional techniques in order to hasten catchup with participant A, including deletion or shortening of periods of silence in the played-back audio. This audio played back from buffer 324 is sent via link 330 to node 340, and through link 334 to participant B's speaker 392. When the buffer playback catches up in the sense that the end of the recorded audio is reached—the last thing participant A said having just been replayed—then the lapse remediator causes audio received from the participant A microphone via link 313 to be routed again to link 330 toward node 340.

Bracket 331 shows the extent of protection for A-to-B audio, from a transmitter in node 320 through link 330. A similar range of protection 351 is provided by the facility to the second side of the call. It can be seen that the facility operates in an analogous way along the second path, conveying participant B's speech from the participant B microphone 391 to the participant A speaker 312, protecting this side of the call from lapses that occur traveling from node 340 to node 320. In particular: lapse detector and notifier 321 behaves in a way analogous to lapse detector and notifier 341, sending B-to-A lapse signal 322 in a way analogous to A-to-B lapse signal 342; lapse remediator 343 behaves in a way analogous to lapse remediator 323; and continuous buffer 344 behaves in a way analogous to continuous buffer 324.

Figure 4:
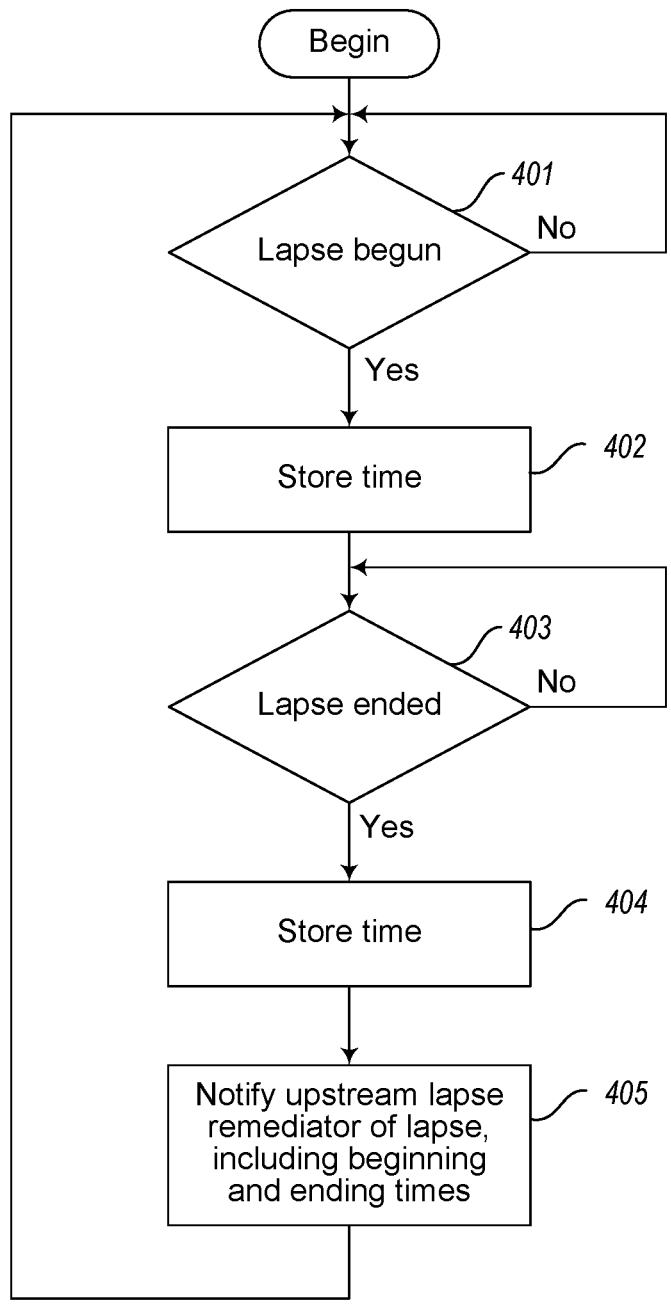
FIG. 4 is a flow diagram showing a process performed by the facility in some embodiments in order to operate the lapse detector and notifier in a node downstream from a link that is protected by the facility with a continuous buffer.

FIG. 4 is a flow diagram showing a process performed by the facility in some embodiments in order to operate the lapse detector and notifier in a node downstream from a link that is protected by the facility with a continuous buffer. In act 401, the facility determines whether a lapse has begun, in some or all of the manners discussed above in connection with FIG. 3. If a lapse has not begun, then the facility continues in act 401 to continue monitoring, else the facility continues in act 402. In act 402, the facility stores the time at which the lapse began. In act 403, the facility monitors to identify the end of the lapse in some or all of the ways discussed above in connection with FIG. 3. If the lapse has not ended, then the facility continues in act 403 to continue monitoring, else the facility continues in act 404. In act 404, the facility stores the time at which the lapse ended. In act 405, the facility notifies the upstream lapse remediator of the lapse, including in the lapse message the lapse beginning time stored in act 402 and the lapse ending time stored in act 404. After act 405, the facility continues in act 401 to monitor for the beginning of the next lapse.

Those skilled in the art will appreciate that the acts shown in FIG. 4 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5:
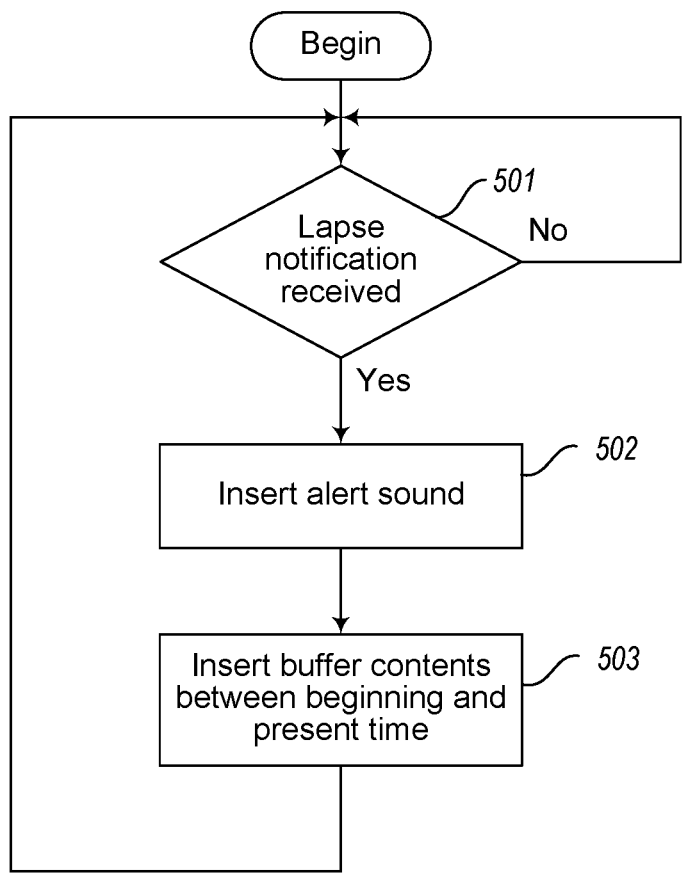
FIG. 5 is a flow diagram showing a process performed by the facility in some embodiments in order to operate the lapse remediator used by the facility in connection with continuous buffers.

FIG. 5 is a flow diagram showing a process performed by the facility in some embodiments in order to operate the lapse remediator used by the facility in connection with continuous buffers. In act 501, the facility determines whether a lapse notification has been received; if so, the facility continues in act 502, else the facility continues in act 501 to continue monitoring. In act 502, the facility causes an alert sound to be sent via the protected link. In act 503, the facility causes the contents of the buffer between the beginning time included in the received lapse notification and catch-up time to be sent via the protected link. As discussed above, in various embodiments, the facility performs various approaches to rate acceleration, silence shortening, and frequency correction to the played buffer contents before sending them across the protected link. After act 503, the facility continues in act 501.

Figure 6:
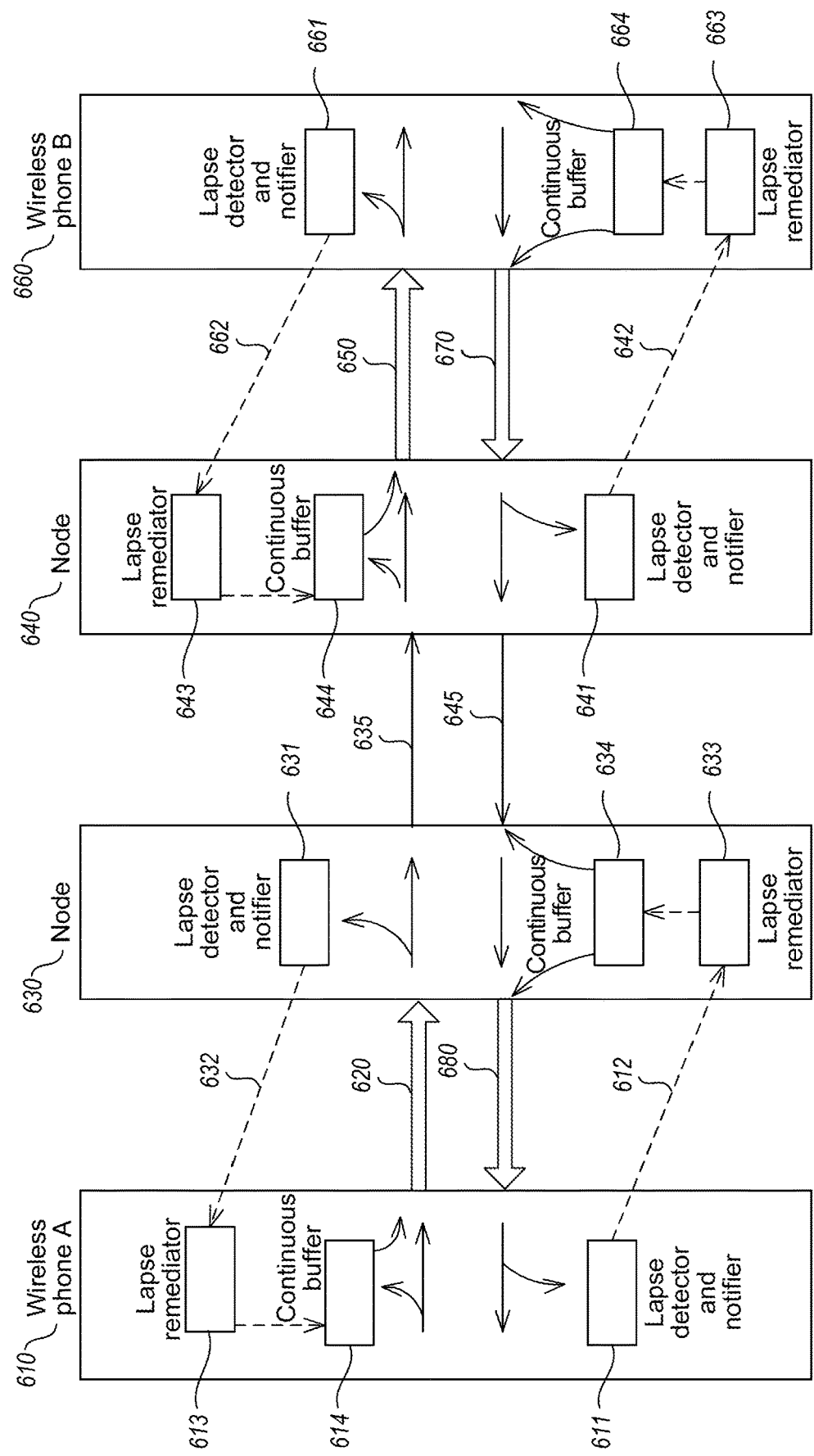
FIG. 6 is a data flow diagram showing operation of the facility in some embodiments using a continuous buffer with respect to a call in which both participants are using wireless phones.

FIG. 6 is a data flow diagram showing operation of the facility in some embodiments using a continuous buffer with respect to a call in which both participants are using wireless phones. The diagram shows a wireless phone 610 used by participant A, as well as a wireless phone 660 used by participant B. The diagram shows two nodes 630 and 640 intermediate to the wireless phones. A link 620 to wireless phone A from node 630 is protected, as is a link 650 from node 640 to wireless phone B 660. In the second path, conveying the second side of the call, a link 670 from wireless phone B to node 640 is protected, as is a link 680 from node 630 to wireless phone A. In some embodiments, these four protected links each contain the wireless communications between a wireless phone and a base station. In some embodiments, the intermediate node is in the base station, such that the protected link contains only the wireless communications to the base station. In some embodiments, the node is somewhere in a wired network between the base station and the other wireless phone, such as a switch, a server, etc.; in these cases, the protected link covers the entire span from the wireless phone to this other node. As shown, links 635 and 645 between nodes 630 and 640 are not protected. It can be seen by comparing FIG. 6 to FIG. 3 that the facility protects these four protected links in the same way as is shown in FIG. 3 and described in connection therewith, using lapse detector and notifiers 611, 631, 641, and 661, which can send lapse signals 612, 632, 642, and 662; lapse remediators 613, 633, 643, and 663; and continuous buffers 614, 634, 644, and 664. Those skilled in the art will appreciate that a particular side of the call can include any number of protected links. Also, though not shown, the two sides of a single call may traverse different paths, which may be protected similarly or differently by the facility.

Figure 7:
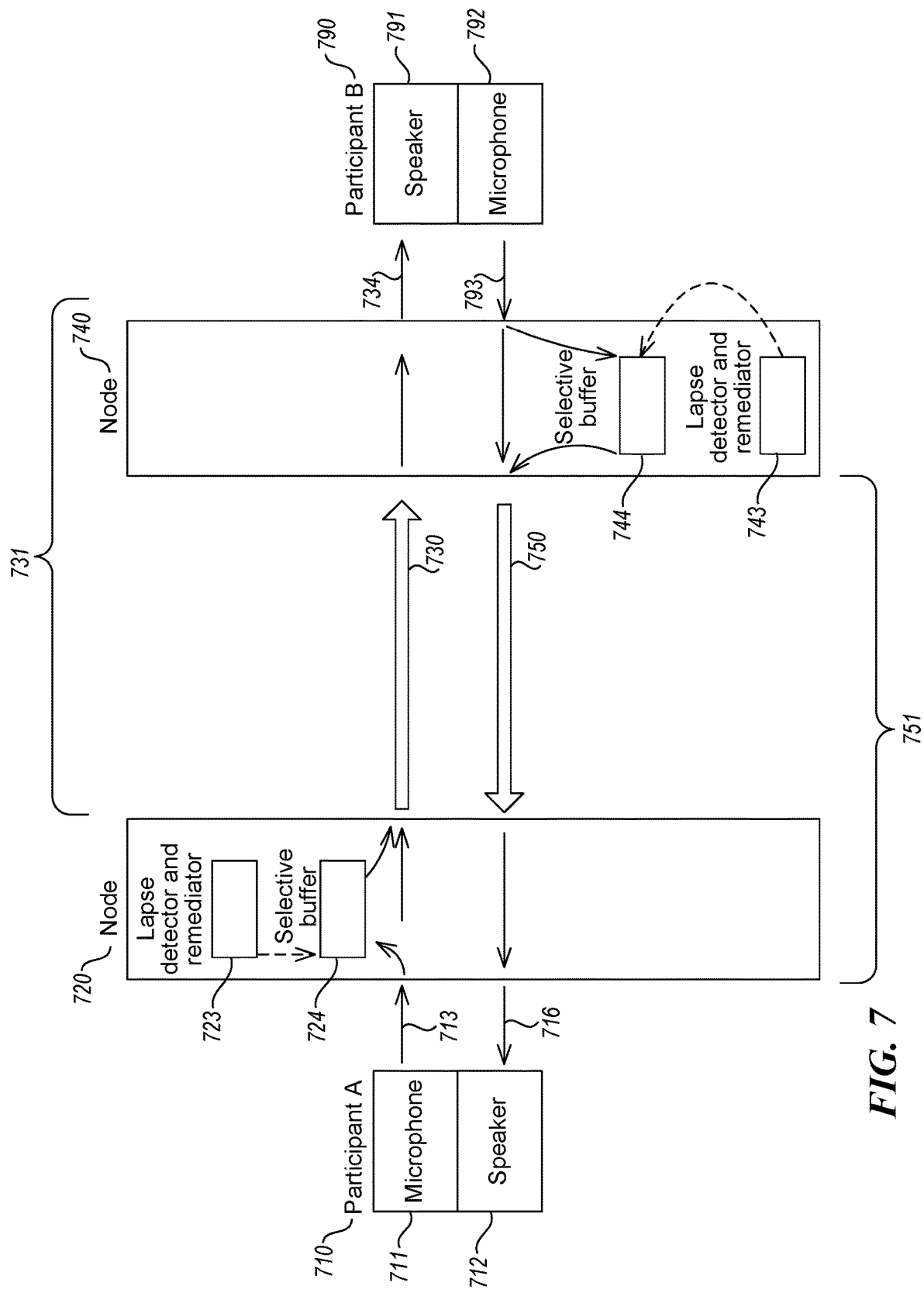
FIG. 7 is a data flow diagram showing operation of the facility in some embodiments in a generalized environment where a selective buffer is used by the facility rather than a continuous buffer.

FIG. 7 is a data flow diagram showing operation of the facility in some embodiments in a generalized environment where a selective buffer is used by the facility rather than a continuous buffer. When audio from the microphone 711 in participant A's wireless phone 710 is received by node 720 via link 713, it is passed forward to protected link 730, and not initially recorded by selective buffer 724. Audio from node 720 via link 730 is received at node 740, which passes it via link 734 to participant B's wireless phone 790, where it is played over speaker 791. A lapse detector and remediator 723 in node 720 monitors the status of protected link 730 to detect any lapses. In some embodiments, the lapse detector and remediator does this by monitoring a stream of acknowledgment messages that would be received from node 740 if link 730 was intact and operating properly. In various embodiments, the facility uses various other approaches to monitoring for monitoring for lapses in the lapse detector and remediator 723. When the lapse detector and remediator identifies the beginning of a lapse, it controls selective buffer 724 to begin recording participant A's audio received via link 713. The lapse detector and remediator proceeds to monitor for the end of the present lapse. When the lapse detector and remediator detects the end of the present lapse, it directs the selective buffer to play its complete contents for transmission in link 730, continuing to record participant A's audio received via link 713 without immediately passing it to link 730. This playing proceeds in the various manners discussed above. When playing catches up to participant A's live audio—that is, the buffer is emptied—the lapse detector and remediator routes participant A's audio received via link 713 directly to link 730. It can be seen by comparing the bottom half of the diagram to the top half that the facility protects protected link 750 in a similar manner. In particular: microphone 792 behaves analogously to microphone 711; links 793, 750, and 716 behave analogously to links 713, 730, and 734, respectively; lapse detector and remediator 743 behaves analogously to lapse detector and remediator 723; and selective buffer 744 behaves analogously to selective buffer 724. Bracket 731 shows the extent to which the facility's protection extends for the first side of the call, as does bracket 751 with respect to second side of the call.

Figure 8:
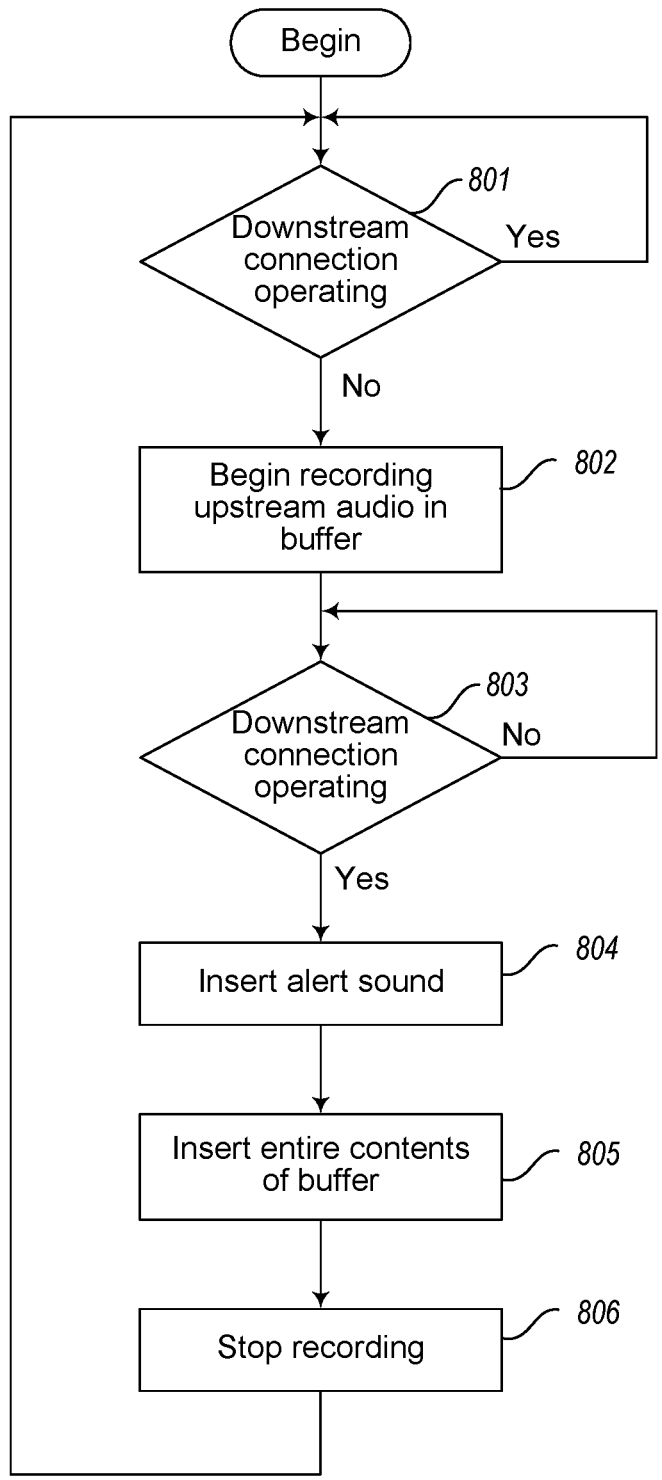
FIG. 8 is a flow diagram showing a process performed by the facility in some embodiments in order to operate the lapse detector and remediator.

FIG. 8 is a flow diagram showing a process performed by the facility in some embodiments in order to operate the lapse detector and remediator. In act 801, if the downstream protected connection is operating, then the facility continues in act 801, else the facility continues in act 802. In act 802, the facility begins recording upstream audio in the selective buffer. In act 803, if the downstream connection is operating, then the facility continues in act 804, else the facility continues in act 803. In act 804, the facility inserts the alert sound into the downstream connection. In act 805, the facility inserts the entire contents of the buffer. In act 806, after the entire contents of the buffer have been inserted, the facility stops recording. After act 806, the facility continues in act 801.

Figure 9:
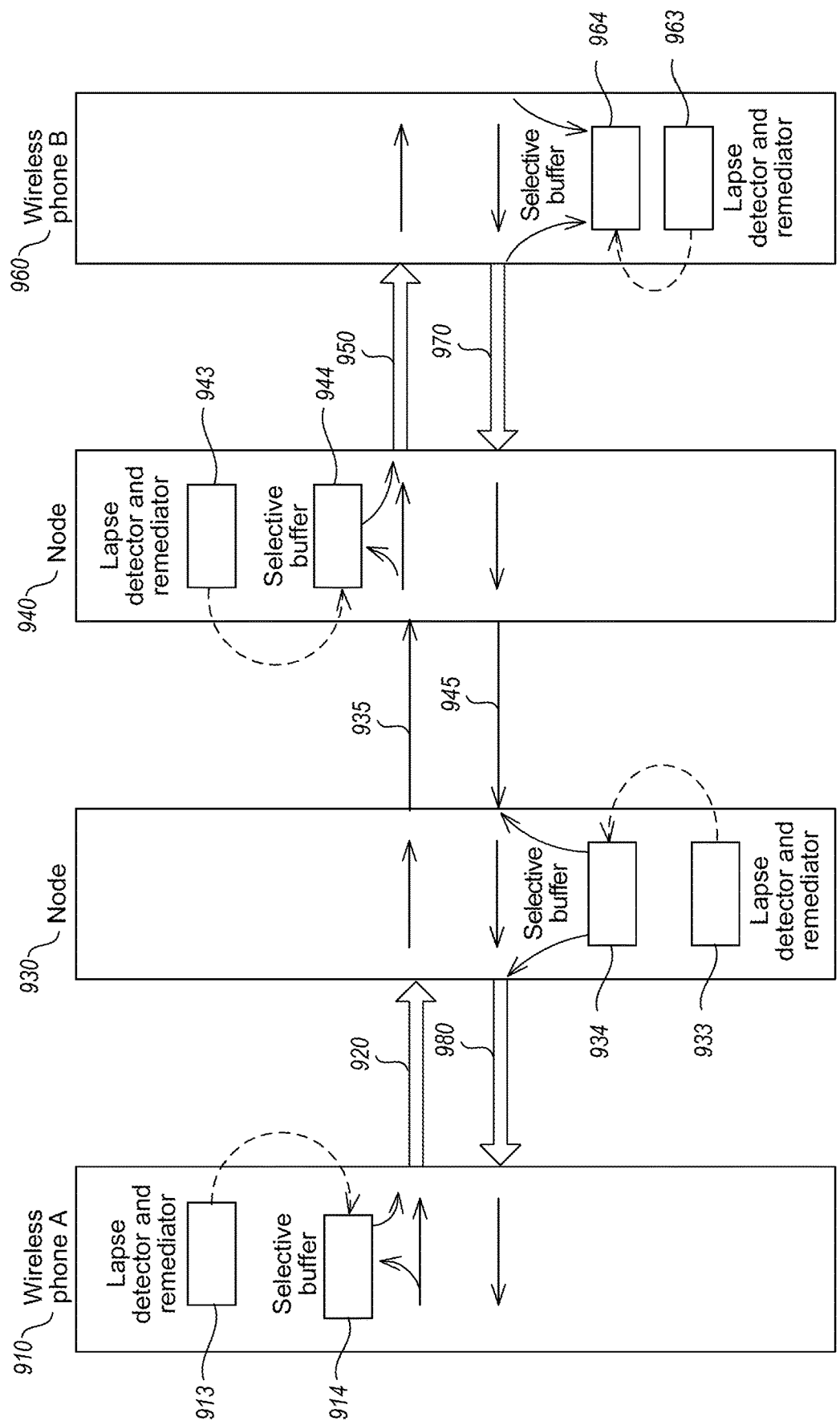
FIG. 9 is a data flow diagram showing operation of the facility in some embodiments using a selective buffer for a call in which both participants are using wireless phones.

FIG. 9 is a data flow diagram showing operation of the facility in some embodiments using a selective buffer for a call in which both participants are using wireless phones. FIG. 9 is similar to FIG. 6, in the sense that nodes 930 and 940 are each at some point intermediate to the two wireless phones 910 and 960, which may be either at the wireless base station that is communicating directly with the adjacent wireless phone, or nodes in the path that are further from the corresponding wireless phone. By comparing FIG. 9 to FIG. 7, it can be seen that the facility protects protected links 920, 950, 970, and 980 in a similar manner to links 730 and 750 shown in FIG. 7 and discussed above. In particular: links 935 and 945 pass audio in a manner analogous to links 635 and 645; lapse detector and remediators 913, 933, 943, and 963 operate in a manner similar to lapse detector and remediators 723 and 743; and selective buffers 914, 934, 944, and 964 behave in a manner analogous to selective buffers 724 and 744.

In various embodiments, the facility detects and remediates call lapses of a variety of types, including some or all of the following, among others 1) Suddenly many SIP errors are observed on the IMS nodes.

A burst of call quality issues or call failures would start to occur as a result of RFC 3261 defined SIP errors from different IMS (IP Multimedia Subsystem) nodes.

2) Link flaps suddenly occur.
There will be a high level of audio/RTP/RTCP/Video quality issues that would be noticeable as packets would be lost/dropped.
3) Suddenly Sev 1 connectivity alarms are raised.
There will be a high level of audio/RTP/RTCP/Video quality issues that would be noticeable as packets would be lost/dropped.
4) Suddenly a large Spike in Memory/CPU is seen.
Due to Memory/CPU spike there will be added delay in processing of packets at various elements resulting in out of order, delayed packets which would result in audio quality.
5) Signaling Storm is seen.
A large amount of Signaling traffic would hit the nodes, Signaling traffic gets priority over media as a result the media packets would take more time to process at each hop in the network causing noticeable audio buffering and out of order issues.
6) K8s Worker node detects a hardware issue.
Due to Memory/CPU spike there will be added delay in processing of packets at various elements resulting in out of order, delayed packets which would result in audio quality.
7) K8s master node detects a connectivity/hardware issue.
There will be a high level of audio/RTP/RTCP/Video quality issues that would be noticeable as packets would be lost/dropped.
8) Audio Becomes bad as we move into a tunnel.
When you travel through tunnels or underground because of the nature of Wireless communication there would be a reduction of RSRP/RSRQ/SNR for the device, mechanisms can be put in place to detect such behavior which causes audio buffer/choppy/out of sync behavior.
9) Device has low battery.
Due to Memory/CPU spike there will be added delay in processing of packets at various elements resulting in out of order, delayed packets which would result in audio quality.
10) We are in a coverage with lot of Signal to noise ratio.
When you travel through tunnels or underground because of the nature of Wireless communication there would be a reduction of RSRP/RSRQ/SNR for the device, mechanisms can be put in place to detect such behavior which causes audio buffer/choppy/out of sync behavior.
11) We are in a Bad RSRP/RSRQ.
When you travel through tunnels or underground because of the nature of Wireless communication there would be a reduction of RSRP/RSRQ/SNR for the device, mechanisms can be put in place to detect such behavior which causes audio buffer/choppy/out of sync behavior.
12) We are in situation where we have Radio Link failure when you go to a coverage gap.
When you travel through tunnels or underground because of the nature of Wireless communication there would be a reduction of RSRP/RSRQ/SNR for the device, mechanisms can be put in place to detect such behavior which causes audio buffer/choppy/out of sync behavior.
13) Use AI/ML detections for advance notice for these faults.
Data gets collected continuously around the performance of network elements as result AI/ML could be utilized to detect various fault conditions in the network.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wireless telephony terminal, comprising:
a microphone configured to transform ambient audio into audio representation data;
a wireless telephony terminal transmitter configured to wirelessly transmit the audio representation data;
a buffer, comprising:
a buffer input configured to receive the audio representation data,
a buffer memory configured to store the audio representation data received at the buffer input, and
a buffer output configured to provide the audio representation data retrieved from the buffer memory;
an audio representation data router configured to route the audio representation data among the microphone, the buffer input, the buffer output, and the wireless telephony terminal transmitter as follows:
for a first period, routing the audio representation data from the microphone to the wireless telephony terminal transmitter;
for a second period succeeding the first period, for which it is determined that the audio representation data wirelessly transmitted by the wireless telephony terminal transmitter will not be received by a base station receiver, routing the audio representation data from the microphone to the buffer input;
in response to determining that the audio representation data wirelessly transmitted by the wireless telephony terminal transmitter will be received by a base station receiver, for a third period succeeding the second period, routing the audio representation data from the microphone to the buffer input, and routing the audio representation data from the buffer output to the wireless telephony terminal transmitter; and
for a fourth period succeeding the third period, routing the audio representation data from the microphone to the wireless telephony transmitter,
wherein:
the audio representation data router is configure to route the audio representation data from the microphone to the buffer input for an entire duration of each call;
the buffer memory is configured as a circular buffer to store the audio representation data as it is received from the microphone for the entire duration of each call, at each time during the duration of each call containing the audio representation data received during a fixed-length interval ending at the present time;
the buffer is configured to index the audio representation data stored in the buffer memory by the time at which it was received at the buffer input, the wireless telephony terminal further comprising a wireless telephony terminal receiver configured to receive a lapse notification message from a base station transmitter, the lapse notification message identifying a time at which a lapse in the audio representation data received by the base station receiver from the wireless telephony terminal transmitter began; and the buffer is configure to proved the audio representation data at the buffer output beginning with the audio representation data indexed with the time identified by the lapse notification message received by the wireless telephony terminal receiver.

2. The wireless telephony terminal of claim 1, wherein the audio representation data router is configured to route the audio representation data from the microphone to the buffer input during the second period in response to determining by the wireless telephony terminal that the audio representation data wirelessly transmitted by the wireless telephony terminal transmitter will not be received by a base station receiver.

3. The wireless telephony terminal of claim 2, wherein the buffer memory is configured to record only the audio representation data received at the buffer input during the second and third periods.

4. The wireless telephony terminal of claim 1 wherein the buffer output is configured to provide the audio representation data retrieved from the buffer memory at a rate higher than the provided audio representation data was received at the buffer input.

5. The wireless telephony terminal of claim 4, the wireless telephony terminal further comprising a pitch normalizer configured to transform the pitch of the audio representation data provided at the buffer output to approximate the pitch of the audio representation data received at the buffer input.

6. The wireless telephony terminal of claim 1, the buffer further comprising a notification tone generator for providing a recorded audio playback notification tone at the buffer output at the beginning of the third period.

7. A node in a telephony network, the node comprising:
a receiver for receiving a first stream of audio representation data conveying a first side of a telephony call from an upstream node in the telephony network;
a transmitter for transmitting a second stream of the audio representation data conveying the first side of the telephony call to a downstream node in the telephony network;
a buffer, comprising:
a buffer input configured to receive the audio representation data,
a buffer memory configured to store the audio representation data received at the buffer input, and
a buffer output configured to provide the audio representation data retrieved from the buffer memory;
an audio representation data router configured to route the audio representation data among the receiver, the buffer input, the buffer output, and the transmitter as follows:
for a first period, routing the audio representation data from the receiver to the transmitter;
for a second period succeeding the first period, for which it is determined that the audio representation data transmitted by the transmitter will not be received by the downstream node in the telephony network, routing the audio representation data from the receiver to the buffer input;
in response to determining that the audio representation data transmitted by the transmitter will be received by the downstream node in the telephony network, for a third period succeeding the second period, routing the audio representation data from the receiver to the buffer input, and routing the audio representation data from the buffer output to the transmitter; and
for a fourth period succeeding the third period, routing the audio representation data from the receiver to the transmitter;
wherein:
the audio representation data router is configured to route the audio representation data from the receiver to the buffer input for an entire duration of the call;
the buffer memory is configured as a circular buffer to store the audio representation data as it is received from the receiver for the entire duration of each call, at each time during the duration of the call containing the audio representation data received during a fixed-length interval ending at the present time;
the buffer is configured to index the audio representation data stored in the buffer memory by the time at which it was received at the buffer input, the node further comprising a receiver configured to receive a lapse notification message from the downstream node, the lapse notification message identifying a time at which a lapse in the audio representation data received by the downstream node from the transmitter began; and
the buffer is configured to provide audio representation data at the buffer output beginning with the audio representation data indexed with the time identified by the lapse notification message received by the receiver.

8. The node of claim 7 wherein the audio representation data router is configured to route the audio representation data from the receiver to the buffer input during the second period in response to determining by the node that the audio representation data wirelessly transmitted by the transmitter will not be received by the downstream node.

9. The node of claim 8, wherein the buffer memory is configured to record only the audio representation data received at the buffer input during the second and third periods.

10. The node of claim 8 wherein the buffer output is configured to provide the audio representation data retrieved from the buffer memory at a rate higher than the provided audio representation data was received at the buffer input.

11. The node of claim 10, the node further comprising a pitch normalizer configured to transform the pitch of the audio representation data provided at the buffer output to approximate the pitch of the audio representation data received at the buffer input.

12. The node of claim 10, the buffer further comprising a notification tone generator for providing a recorded audio playback notification tone at the buffer output at the beginning of the third period.

13. A method in a computing system for conveying a first side of a voice call from a first participant to a second participant, the method comprising:
over the duration of the voice call, receiving the first side of the voice call;
seeking to forward the received first side of the voice call to a downstream node;
recording the received first side of the voice call for at least part of the voice call;
identifying a just-ended portion of the voice call for which forwarding of the received first side of the voice call was unsuccessful;
in response to the identifying, transmitting to the downstream node the recorded first side of the voice call that coincides with the identified portion of the voice call;

determining that the portion of the voice call for which forwarding of the received first side of the voice call was unsuccessful has begun;

in response to the determining, beginning the recording; and continuing the recording until transmitting the recorded first side of the voice call that coincides with the identified portion of the voice call is complete.

14. The method of claim 13 wherein the recording records the received first side of the voice call for the entire duration of the voice call, discarding portions of the recording that were received more than a threshold time before the present time.

15. The method of claim 14, the method further comprising:

indexing the recorded received first side of the voice call with the times across which the first side of the voice call was received; and receiving from the downstream node a lapse notification identifying the time at which a lapse in communication between the computing system and the downstream node, began, wherein the identifying identifies a portion of the voice call beginning at a time index corresponding to the time identified by the lapse notification.

16. The method of claim 13, further comprising:

in response to the identifying:

subjecting the recorded first side of the voice call that coincides with the identified portion of the voice call to voice transcription to produce a textual representation of the recorded first side of the voice call that coincides with the identified portion of the voice call; and transmitting the produced textual representation for display to the second participant.

17. The method of claim 13, wherein the transmitting of the recorded first side of the voice call is at a rate higher than a rate at which the recorded first side of the voice call was received.

18. The method of claim 17, further comprising transforming the pitch of the transmitted recorded first side of the voice call to more closely match a pitch at which the recorded first side of the voice call was received.

19. The method of claim 13 wherein the receiving receives the first side of the voice call from an upstream telephony node.

20. The method of claim 13 wherein the method is performed in a wireless phone, and the receiving receives the first side of the voice call from an analog to digital converter incorporated into the wireless phone.

* * * * *

UNITED STATES PATENT AND TRADEMARK OFFICE
CERTIFICATE OF CORRECTION

PATENT NO. : 11,943,153 B2
APPLICATION NO. : 17/360372
DATED : March 26, 2024
INVENTOR(S) : Kevin Yao and Prashant Raghuvanshi It is certified that error appears in the above-identified patent and that said Letters Patent is hereby corrected as shown below:

In the Claims

Claim 1, Column 10:
Line 51: after "wireless telephony" and before "transmitter" insert -- terminal --
Line 56: "configure" should be -- configured --

Claim 1, Column 11:
Line 5: "configure" should be -- configured --
Line 5: "proved" should be -- provide --

Signed and Sealed this
Thirtieth Day of April, 2024

*Katherine Kelly Vidal*

Katherine Kelly Vidal
*Director of the United States Patent and Trademark Office*